Nov. 3, 1931. S. SCHWARTZ Re. 18,241

FABRIC

Original Filed March 27, 1929 3 Sheets-Sheet 1

Samuel Schwartz
INVENTOR

BY Mock & Blum
ATTORNEYS.

Nov. 3, 1931. S. SCHWARTZ Re. 18,241

FABRIC

Original Filed March 27, 1929 3 Sheets-Sheet 2

INVENTOR
Samuel Schwartz
BY Mock & Blum
ATTORNEYS.

Nov. 3, 1931. S. SCHWARTZ Re. 18,241

FABRIC

Original Filed March 27, 1929 3 Sheets-Sheet 3

INVENTOR
Samuel Schwartz
BY Mock & Blum
ATTORNEYS.

Reissued Nov. 3, 1931

Re. 18,241

UNITED STATES PATENT OFFICE

SAMUEL SCHWARTZ, OF ALBANY, NEW YORK

FABRIC

Original application filed March 27, 1929, Serial No. 350,193. Divided and application filed July 2, 1929, Serial No. 375,494. Original No. 1,794,554, dated March 3, 1931. Application for reissue filed September 2, 1931. Serial No. 560,833.

My invention relates to a new and improved fabric.

One of the objects of my invention is to provide a new and improved fabric having a backing made of worsted or other relatively strong non-crushable and resilient material, and a face of silk or other relatively fragile and expensive material.

Another object of my invention is to provide a combination fabric which shall be especially adapted for use in making neckties, although my invention is not limited to this specific use.

This application is a division of my application, Ser. No. 350,193, filed in the United States Patent Office on March 27th, 1929, for improvements in fabric and method of making the same.

Other objects of my invention will be set forth in the following description and drawings which illustrate a preferred embodiment of my invention, it being understood that the above general statement of the objects of my invention is intended merely to generally explain the same and not to limit it in any manner.

This general type of fabric is disclosed in my previously filed application Ser. No. 314,442 filed October 23d, 1928.

While I do not wish to limit myself to material, I prefer to use worsted warp threads for the back fabric, silk warp threads for the face fabric, and to employ a worsted weft thread. If a binder warp is utilized, this can be made of silk thread and this is preferable. The advantage of using a worsted back fabric interwoven with the silk face fabric is that the worsted fabric is relatively non-crushable, so that it does not readily crease, and tends to assume an unwrinkled shape, after it has been bent or creased. The silk fabric alone can be readily creased or winkled, but the use of the worsted backing makes the composite fabric non-crushable.

Figure 4:
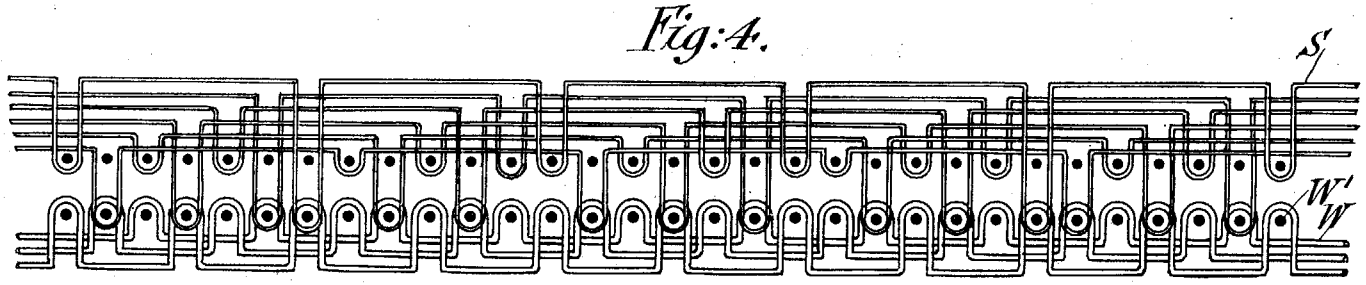
Fig. 4 is a diagrammatic view showing the fabric made with the "satin" type of weave.

In the embodiment shown in Fig. 4, the silk is woven to form what is designated as the "satin" type of weave, and the worsted backing is woven to form what is designated as the "serge" type of weave. Every complete stroke or vibration of the shuttle may be considered as consisting of a forward stroke and a return stroke. During the forward stroke of the shuttle, the worsted filler thread W′ is caused to cross or bind one-sixth of the silk warp threads S, namely, two silk threads out of each group of twelve. During this forward stroke of the shuttle, the filler thread only weaves the silk threads, without weaving the worsted threads or cloth. On the return stroke of the shuttle, the shed is formed in the worsted warp threads W so that the two silk threads which have been crossed or bound by the filled thread, are now caused to interlock with the worsted warp thread W associated with the corresponding group. However, I do not wish to limit myself to any particular type of interlocking weave, as long as the backing is sufficiently interwoven with the facing to impart the resilience and other desirable properties of the backing to the face. The number of silk warp threads in each group, which are interlocked with the worsted warp threads, may be varied within considerable limits, without departing from the invention. For example, I have found it sufficient if only one silk warp thread out of each group of twelve silk warp threads is caused to interweave with the corresponding worsted warp thread.

It is to be understood that the silk warp thread is not bound with the corresponding worsted warp thread in the same dent unless the worsted warp thread is raised during the return stroke of the shuttle. Hence, upon the forward stroke of the shuttle, a "satin" weave is formed in the silk face fabric by binding one-sixth of the warp threads therein, and upon the return stroke of the shuttle this one-sixth of the silk warp threads is also caused to interlock with the corresponding worsted warp threads. Also, upon the return stroke of the shuttle, a shed is formed in the worsted warp threads W so that the "serge" type of weave is formed in the worsted backing, while interweaving the worsted back cloth with the silk face cloth. In this "serge" type of weave, the filler thread crosses or binds one-third of the worsted warp threads. Whenever I refer to the silk warp thread being interlocked with a worsted warp thread which is in the same dent, it is to be understood, that if a filler thread is used for this purpose, that the silk warp thread and said corresponding worsted warp thread, interlock with the filler thread.

In Fig. 4, I have illustrated only six silk warp threads (instead of a full group of twelve threads) for the sake of clearness. The length of the weft which is inserted into the fabric by a single movement of the shuttle may be designated as a cross-length thereof. In the satin type of weave illustrated in Fig. 4, each cross-length of the weft thread engages two silk warp threads in each group of twelve. Hence, all the silk warp threads are interwoven in six complete reciprocations of the shuttle, by six upper cross-lengths of the weft or filler thread.

In Fig. 4, it may be assumed that the weft thread at the extreme left of the figure was produced by the sixth complete reciprocation of the shuttle, which is about to perform six additional complete reciprocations, since it may be assumed that the reciprocations of the shuttle may be considered as consisting of a number of consecutive series, each of said series having six members.

Figure 1:
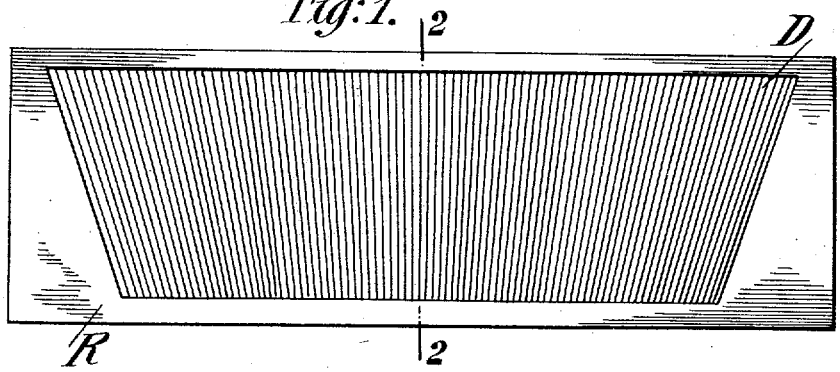
Fig. 1 is a diagrammatic view showing the reed which is utilized for weaving the improved cloth.
Figure 2:
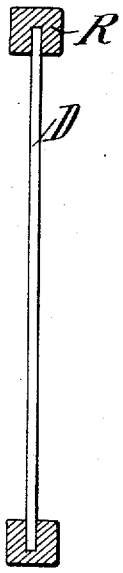
Fig. 2 is a side elevation of Fig. 1.
Figure 3:
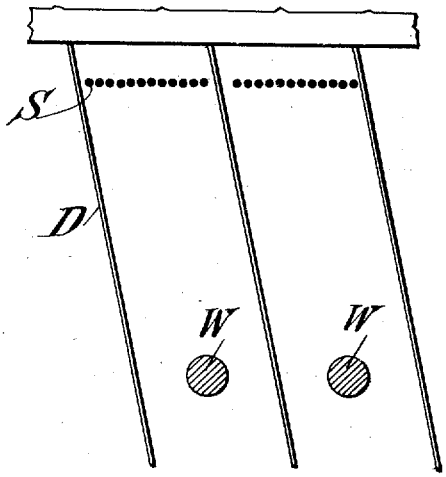
Fig. 3 is a diagrammatic view showing how the warp threads of the back fabric, and how the warp thread of the face fabric are arranged within the reed, when the weft or filler thread is inserted.

The top silk warp thread is not engaged by the filler thread until the shuttle has performed the forward movement of its sixth reciprocation. Upon the return movement of the shuttle in said sixth reciprocation, the top silk warp thread is moved below to the level of the corresponding worsted thread (which may be considered as being the bottom thread in Fig. 4) so that the silk thread (and its corresponding thread in the full group of twelve threads shown in Fig. 3) are interwoven with the worsted warp thread corresponding to said group without moving the worsted warp thread up into the silk warp, which would be objectionable because the silk would then not form a continuous facing to hide the wool. Of course, it would be immaterial if the worsted warp threads were on top, and the silk warp threads were on bottom, during the actual weaving.

Following the top silk warp thread in Fig. 4, it can be seen that it (and its corresponding thread in the full group of twelve) are interlocked with the weft thread in the sixth succeeding forward movement of the shuttle, without being interlocked or interwoven with the worsted thread. The top silk warp thread (and said corresponding thread) are again interlocked with the weft thread, on the next sixth forward movement of the shuttle, without being interwoven with the corresponding worsted warp thread.

On the return stroke corresponding to the next sixth reciprocation of the shuttle, the two silk warp threads are again moved below the corresponding worsted warp thread and again interlocked by the worsted weft thread.

Excluding the weft thread shown at the extreme left of Fig. 4, this illustrates thirty complete reciprocations of the shuttle. During these thirty reciprocations, the weft thread engages the two silk warp threads five times.

The two silk threads are interlocked with their corresponding worsted warp thread on each eighteenth reciprocation of the shuttle. If the worsted warp threads were interlocked only on each eighteenth reciprocation of the shuttle, then a loose, non-continuous weave would be formed in the worsted warp threads. Hence, a shed is formed in the worsted warp threads upon the return strokes of the shuttle so that a serge weave is formed in the worsted warp threads, one-third of said worsted warp threads being interlocked by each return cross-length of the weft thread.

The improved fabric thus produced has a tight, continuous silk facing, free from any worsted (save the filler) which conceals from view the tightly woven worsted back, said worsted back being interwoven with the silk facing, and being also independently interwoven, to produce the continuous back.

Figure 5:
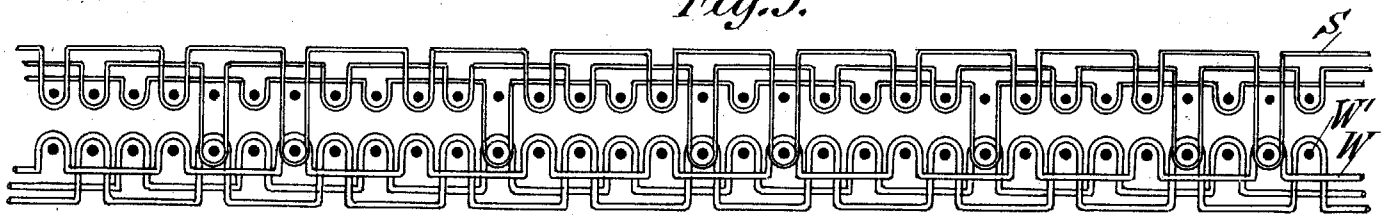
Fig. 5 is a view similar to Fig. 4, showing the "serge" type of weave.

The cloth diagrammatically illustrated in Fig. 5 is similar to that illustrated in Fig. 4, save that the "serge" type of weave is formed in both the silk face fabric and in the worsted back fabric.

Figure 6:
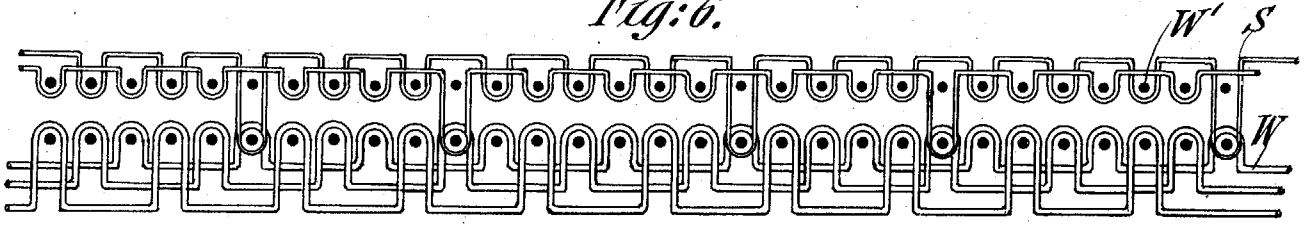
Fig. 6 is a view similar to Fig. 4 showing how the "taffeta" type of weave is employed.

The cloth diagrammatically illustrated in Fig. 6 is formed in a manner similar to that previously described, save that a "taffeta" type of weave is formed in the silk fabric in which six out of each group of twelve or one-half of the silk war threads are bound at each forward stroke of the shuttle.

Figure 7:
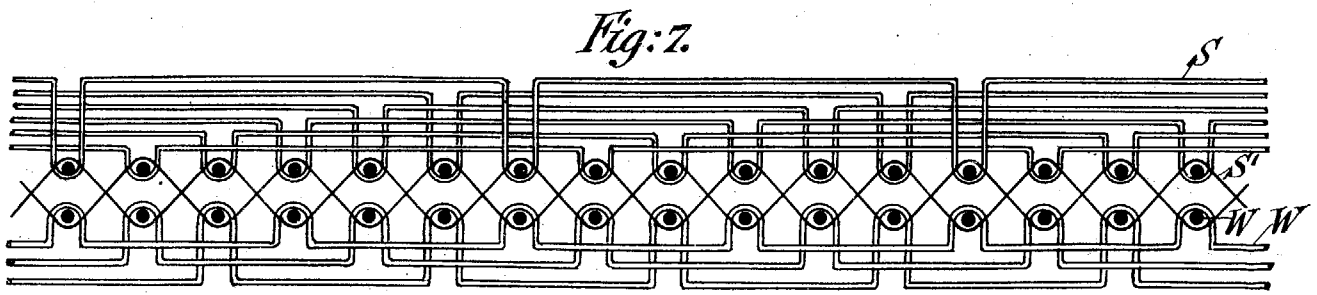
Figs. 7–9 are diagrammatic views similar to Figs. 4–6 respectively, a binder being employed in the embodiments illustrated in Figs. 7–9 inclusive, while no binder is employed in the embodiments shown in Figs. 4–6 inclusive.

In the embodiment shown in Fig. 7, a silk binder thread S′ is utilized to bind silk warp threads S to the worsted warp threads W. A worsted filler thread W′ is utilized.

Fig. 7 illustrates the "satin" type of weave previously shown in connection with Fig. 4.

Figure 8:
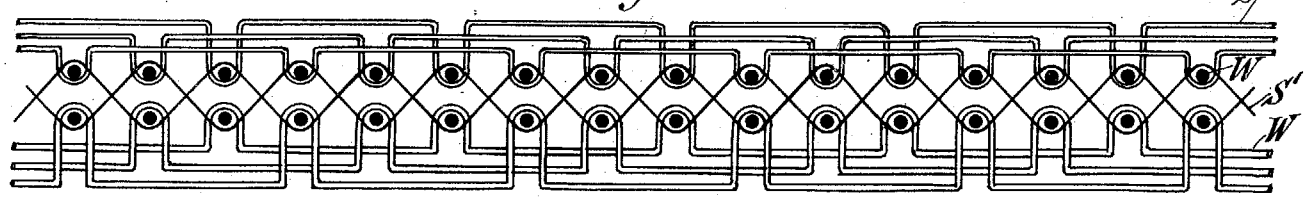

Fig. 8 illustrates a fabric similar to that diagrammatically shown in Fig. 7, the silk being woven to form the "serge" type of weave.

Figure 9:
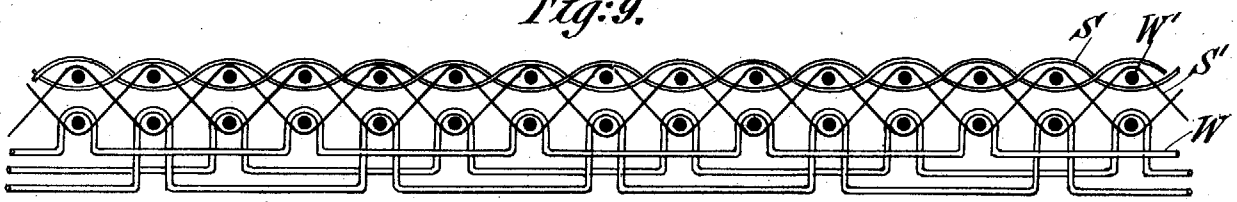

Fig. 9 illustrates a fabric similar to that shown in Fig. 7, save that the silk is woven to form the "taffeta" type of weave.

Considering for example, the "satin" type of weave shown in Fig. 4, each complete stroke of the shuttle causes one-sixth of the silk warp to be bound with the worsted warp or cloth. Hence, after six complete vibrations of the shuttle, the entire group of twelve silk threads in each dent have been bound to one of the lower worsted threads the same dent. The same result is secured in the other weaves illustrated, or in any other type of weave. The result is an interwoven fabric of silk cloth and worsted cloth, each element of the composite fabric forming a separate piece of cloth interwoven with the other.

While the warp threads may vary in thickness dependent on the purpose for which it is intended, I have found it satisfactory to use No. 50/2 ply worsted, (36 ends to the inch) and to use 432 ends of silk to the inch, of a three-ply organzine silk, No. 13—15 denier.

The worsted filler may be about No. 30, approximately 100 picks per inch. Hence the rear facing constitutes a continuous fabric, that is, it has the same appearance and properties as though it had been separately woven.

The composite cloth thus formed does not wrinkle as quickly as any silk cloth, and it has the ornamental appearance of pure silk cloth.

It has heretofore been proposed to weave a silk cloth having a woolen back or a cotton back.

However, it is new to so tightly interweave a continuous thin silk facing with a heavy wool back so as to impart the necessary resistance to wrinkling or crushing to the silk. The improved multiple ply fabric is homogeneous, that is, the silk and wool stretch and bend together, so that the silk is properly reinforced at all times. This makes the fabric especially suitable for making neckties or coats, as previously mentioned, or other articles of wearing apparel.

As shown in Figs. 4, 5 and 6, the silk warp threads are moved below the wool warp threads at regular intervals, so that the silk warp threads are thus interlocked with the woolen warp threads at spaced points along said silk warp threads, namely, in a direction parallel to the length of the fabric. For example, considering the top silk warp thread in Fig. 4, it is clear that this thread (and the corresponding silk warp thread in its group) are interlocked with one of the worsted warp threads by the same portion of the filler thread which crosses or connects the wool warp threads. This does not occur at every reciprocation of the shuttle, but does occur sufficiently to cause the silk facing to have the appearance of a continuous silk fabric which is sufficiently interlocked with the wool backing to make the silk as wrinkle-proof as a piece of woven wool fabric. I do not wish to limit the invention to an absolutely continuous silk facing, because in fancy weaves, small portions of the wool might be exposed without departing from the invention.

Likewise, whenever I specify silk in the claims, I do not wish to be limited to the use of pure natural silk, as any thin crushable material could be substituted. Likewise, whenever I specify wool in the claims, I do not wish to be limited to the use of pure natural wool, as any resistant and resilient textile material could be substituted.

According to my invention, the weave is formed in the face fabric and the partially woven face fabric is then caused to interlock with the back fabric. This makes it possible to use a much heavier face fabric and a much heavier back fabric. Hence if the composite fabric is used for making a necktie for example, no lining or filler is required. Likewise, if a coat is to be made, a sufficiently heavy fabric can be produced to eliminate the necessity of a lining. The silk face made according to my method can be woven as closely as a separate silk cloth. In the improved fabric, each thick rear warp thread corresponds to and is interwoven with a group of the thin front warp threads. Selected members of a succession of such groups of thin warp threads are connected by a length of the weft thread corresponding to a single movement of the shuttle, and said selected members are interwoven with the rear warp threads by the succeeding length of the weft thread inserted by the return movement of the shuttle, and said succeeding length also interweaves the rear warp threads.

The silk threads utilized are preferably undyed and in the gum so that the shed can be readily formed with minimum interference.

The old fabric having a silk facing and a cotton or wool back had relatively few warp threads per inch, both in the face and of the back, in order to weave it smoothly. The total number of warp threads and of filler threads per inch, corresponding to an ordinary single fabric.

According to my invention, the number of silk warp threads per inch, the number of worsted warp threads per inch, and the number of filler ends per inch, separately correspond to those used in weaving a single heavy fabric.

I have shown a preferred embodiment of my invention, but it is clear that numerous changes and omissions can be made without departing from its spirit.

I claim:

1. A flat homogeneous, multiple-ply fabric for wearing apparel, comprising a facing made of silk, said silk facing comprising relatively thin silk warp threads interwoven with filler thread, said fabric also comprising a wool backing comprising relatively thick wool warp threads interwoven with filler thread, the silk warp threads being more numerous than the wool warp threads, said silk facing being substantially continuous to substantially conceal the wool backing, said silk warp threads and said wool warp threads being sufficiently interwoven by intermediate thread to form a homogeneous fabric in which the silk facing is reinforced by the wool backing so that the entire fabric has the resistance to crushing of the wool backing.

2. A flat, homogeneous, multiple-ply fabric for wearing apparel, comprising a facing made of silk, said silk facing comprising relatively thin silk warp threads interwoven with filler thread, said fabric also comprising a wool backing comprising relatively thick wool warp threads interwoven with filler thread, the silk warp threads being more numerous than the wool warp threads, said silk facing being substantially continuous to substantially conceal the wool backing, said silk warp threads and said wool warp threads being sufficiently interwoven by intermediate filler thread to form a homogeneous fabric in which the silk facing is reinforced by the wool backing so that the entire fabric has the resistance to crushing of the wool backing.

3. A flat, homogeneous, multiple-ply fabric for wearing apparel, comprising a facing made of silk, said silk facing comprising relatively thin silk warp threads interwoven with filler thread, said fabric also comprising a wool backing comprising relatively thick wool warp threads interwoven with filler thread, the silk warp threads being more numerous than the wool warp threads, said silk facing being substantially continuous to substantially conceal the wool backing, said silk warp threads being sufficiently interwoven at spaced points thereof with the wool warp threads by the filler thread with which said wool warp threads are interwoven, to form a homogeneous fabric in which the silk facing is reinforced by the wool backing so that the entire fabric has the resistance to crushing of the wool backing.

4. A flat, homogeneous, multiple-ply fabric for wearing apparel, comprising a facing made of crushable material, said facing comprising relatively thin warp threads interwoven with filler thread, said fabric also comprising a wool backing comprising relatively thick wool warp threads interwoven with wool filler thread, the face warp threads being more numerous than the wool warp threads, said facing being substantially continuous to substantially conceal the wool backing, said face warp threads being sufficiently interwoven at spaced points thereof with the wool warp threads by the wool filler thread with which said wool warp threads are interwoven, to form a homogeneous fabric in which the crushable facing is reinforced by the wool backing and the wool filler thread so that the entire fabric has the resistance to crushing of the wool backing.

5. A neck-tie fabric having a longitudinal zone thereof composed of a facing ply and a backing ply, said ply comprising silk warp threads interwoven with filling threads, said backing ply comprising wool warp threads interwoven with wool filling threads and being substantially concealed by said facing ply, said facing and backing plies being interwoven at spaced points by extending silk threads of the facing ply around wool threads of the backing ply whereby the silk facing is reinforced and has the resistance to crushing of the wool backing.

In testimony whereof, I affix my signature.

SAMUEL SCHWARTZ.